United States Patent [19]

Dawson

[11] 4,028,037

[45] June 7, 1977

[54] TUBE TREATING AND APPARATUS THEREFOR

[75] Inventor: David H. Dawson, Midland, Mich.

[73] Assignee: The Dow Chemical Company, Midland, Mich.

[22] Filed: May 26, 1976

[21] Appl. No.: 690,227

Related U.S. Application Data

[60] Continuation of Ser. No. 559,347, March 17, 1975, abandoned, which is a division of Ser. No. 498,680, Aug. 19, 1974, Pat. No. 3,939,243.

[52] U.S. Cl. .............................. 425/392; 425/403; 264/294; 264/296; 72/274; 72/367
[51] Int. Cl.$^2$ ........................................ B29C 17/00
[58] Field of Search .......... 425/392, 393, 395, 397, 425/317, 343, 325, 445, 403; 72/348, 349, 274, 367, 285, 76; 264/294, 296, 322, 230, 209

[56] References Cited

UNITED STATES PATENTS 3,482,007 12/1969 Routh ............................ 425/392 X
3,707,086 12/1972 Berg ..................................... 72/349

Primary Examiner—Robert L. Spicer, Jr.
Attorney, Agent, or Firm—R. B. Ingraham

[57] ABSTRACT

Synthetic resinous thermoplastic tubing is reduced radially in diameter with minimal increase in length by passing the tube through a plurality of successively smaller dies wherein a minor portion of the die moves relative to a major portion of the die during the reduction step. Plastic tube is obtained which has a tendency to expand radially with a minimal alteration in its length. Such tubing is particularly suitable for lining of pipe.

3 Claims, 8 Drawing Figures

TUBE TREATING AND APPARATUS THEREFOR

This application is a Continuation of application Ser. No. 559,347, filed Mar. 17, 1975, now abandoned, which in turn is a Division of application Ser. No. 498,680, filed Aug. 19, 1974, now U.S. Pat. No. 3,939,243.

Plastic lined pipe finds wide application in a variety of applications. Such pipe beneficially is chemically resistant to many materials which are processed and, in general, is easily installed and has the added advantage of being more resistant to impact than piping such as glass, ceramic or the like. Many thermoplastic materials are employed to line pipe. The particular thermoplastic selected is usually dependent on the intended service. Oftentimes when a thermoplastic lined pipe has been in service for a period of time, fracture of the liner occurs at a location generally adjacent the one or the other of the terminal flanged ends. Such failure is oftentimes considered to be due to undesired residual molecular orientation in the plastic liner. In order to minimize such residual orientation or tendency of the liner to shrink when exposed to temperature near the upper service temperature limit of the pipe, some plastic lined pipes have been prepared by the process of swaging the metallic outer casing over a plastic liner. The swaging may be continued until the liner is firmly lodged within the metallic casing and the metallic casing has reached a standard size.

Other methods of lining a pipe include stretching of an oversized plastic liner to reduce its diameter, inserting the stretched liner in a pipe, removing the tension on the liner and permitting the liner to expand and contact the inner wall of the casing. Some plastic lined conduit is prepared by placing an undersized liner within a casing, heating the liner and inflating the liner with liquid or gas pressure until the liner contacts the inner wall of the casing. Such procedures, although satisfactory for many purposes, are generally not believed to provide conduit having optimum properties for the materials employed.

It would be desirable if there were available an improved method and apparatus for the preparation of plastic tubes.

It would also be desirable if there were available an improved method and apparatus for the preparation of plastic tubes which had been radially reduced in diameter without generally altering the length thereof.

It would also be desirable if there were available an improved method for the preparation of plastic lined conduit.

These benefits and other advantages in accordance with the present invention are achieved in a method of preparing a synthetic resinous tube comprising preparing a synthetic resinous tube, the steps of the method comprising providing a synthetic resinous thermoplastic tube having a diameter greater than the desired diameter introducing a portion of the tube into a plurality of die plates having successively smaller circular openings therein. The tube having a region of decreased diameter generally adjacent the die plate having the smaller opening and a region of major diameter generally adjacent the die plate having the largest opening, moving at least one of the die plates towards the region of major diameter thereby reducing the diameter of a portion of the tube while maintaining the conduit in fixed relation to at least a major portion of the remaining die plates. Subsequently, in sequence, moving each said plurality of die plates in the hereinbefore described manner to provide a synthetic resinous thermoplastic tube having reduced diameter, the foregoing steps being performed at a temperature between the glass temperature of the resinous tube and the softening temperature.

Also contemplated within the scope of the present invention is a tube diameter reducing apparatus. The tube diameter reducing apparatus comprises in cooperative combination a frame, the frame having a longitudinal axis, a plurality of die plates within the frame and selectively portionable therein, the die plates each defining a tube receiving opening of generally successively decreasing diameter, the openings of the die plates being disposed in planes generally normal to the longitudinal axis, the openings of the die plates being generally coaxially disposed, means to selectively position the die plates along the axis of the frame, and provide sequential movement of a minor portion of the die plates relative to a major portion thereof, subsequently moving each of the die plates in such a manner.

Also, contemplated within the scope of the present invention is a method for lining conduit which comprises providing a conduit to be lined. The conduit to be lined having a generally cylindrical passage therein, providing a synthetic resinous thermoplastic tube having an outside diameter greater than the diameter of the cylindrical passage reducing the outside diameter of the resinous tube in the hereinbefore described manner to a diameter which is sufficiently small to permit entry of the plastic tube into the conduit, inserting the plastic tube into the conduit and causing the tube to expand and contact at least a portion of the inner wall defining the conduit passageway.

Further features and advantages of the present invention will become more apparent from the following specification when taken in connection with the drawing wherein:

FIGS. 1 through 3 schematically depict portions of the process in accordance with the invention;

Figure 1:
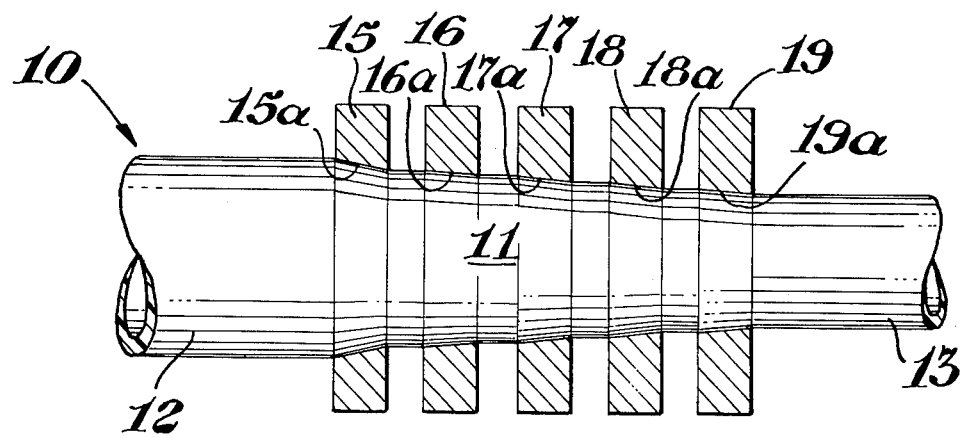

In FIG. 1 there is schematically depicted an assembly generally designated by the reference numeral 10 which assists in illustrating the process of the invention. The assembly 10 comprises a synthetic resinous thermoplastic tube 11. The tube 11 has a region of major diameter 12 and a region of minor diameter 13 remotely disposed therefrom. Disposed between the region of major diameter 12 and the region of minor diameter 13 are a plurality of die plates 15, 16, 17, 18 and 19. Each of the die plates 15 through 19 have decreasing die orifices designated by the corresponding number followed by the suffix a. The orifices 15a through 18a are of successively decreasing diameter and each has a generally frustoconical configuration. Initially placing the tube 11 within the die plates 15 through 19, the largest die plate 15 is forced over the tube and the die plates having successively smaller openings are in turn positioned on the tube.

Figure 2:
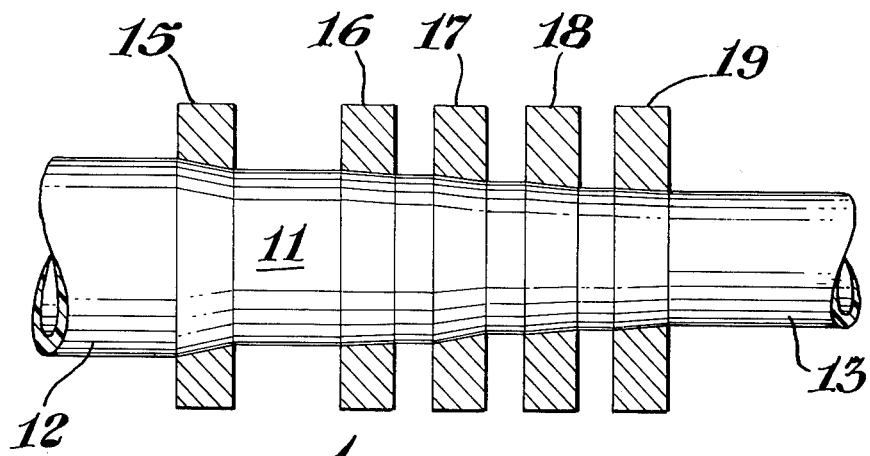

In FIG. 2 the die plate 15 partly reduces the diameter of the tube over the region through which it has been moved. The remaining die plates 16, 17 and 18 remain fixed relative to the tube and retain the tube 11 frictionally therein.

Figure 3:
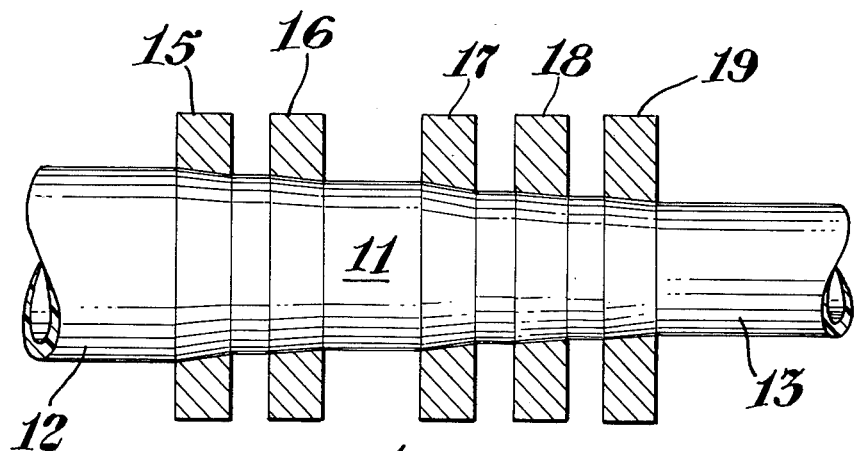

In FIG. 3 the die plates 15, 17, 18 and 19 have been maintained fixed relative to the tube and the die plate 16 moved toward the die plate 15 while the tube 11 is frictionally retained within the openings of the dies 15, 17, 18 and 19. Thus, by successively advancing one of the die plates and maintaining the remaining die plates in a fixed position the diameter of the tube is reduced from the diameter of the portion 12 into the portion of the diameter 13 without introducing longitudinal stretch or orientation into the plastic tube.

In FIGS. 1 through 3 the assembly has been shown employing five die plates. Five die plates are used for purpose of illustration. For most plastic tubes it is desirable to employ ten or more die plates in order to maintain adequate frictional engagement of the tubes by the "fixed" die plates.

Figure 4:
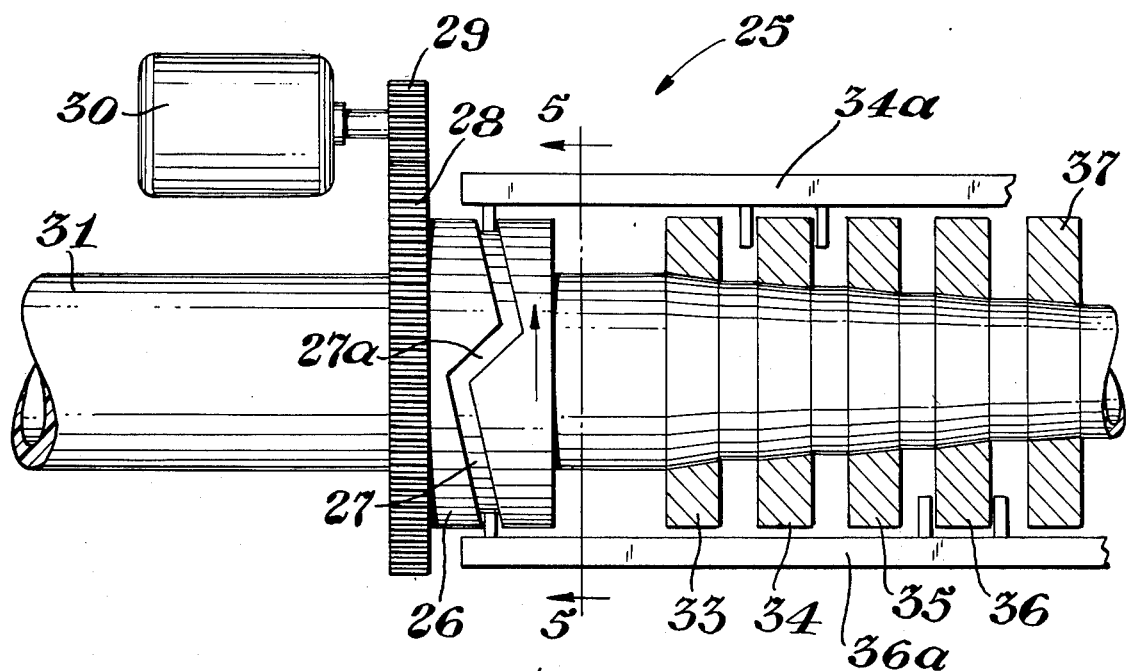
FIG. 4 is a schematic representation of the function of an apparatus in accordance with the present invention.

FIG. 4 depicts a partly sectioned cut-away schematic representation of the principal functional parts of an apparatus in accordance with the invention. The apparatus of FIG. 4 is generally designated by the reference numeral 25. The apparatus comprises a frame (not shown) which supports a rotable cam 26 having a generally circumferential camming groove 27. The cam 27 is of generally hollow cylindrical configuration and has affixed thereto a drive gear 28 which in turn is in operative combination of a drive gear or spur gear 29 rotated by a motor 30. A synthetic resinous thermoplastic conduit 31 is disposed within the cam 26 but not in contact therewith. A plurality of die plates 33, 34, 35, 36 and 37 are disposed generally adjacent to the cam 26 and are coaxially disposed relative thereto. Each of the die plates 33 through 37 have openings of successively decreasing diameter in the manner similar to the openings of die plates 15 through 19 of FIGS. 1 through 3. A die plate positioning rod 34a is in operative communication with the camming groove 27 and the die plate 34. Similarly, a positioning rod 36a is in operative combination with die plate 36 and the camming groove 27 of the cam 26. On rotation of the cam 26 the positioning rod 34a and associated positioning rods 33a, 35a, 36a and 37a (not shown), move the die plate in a manner as generally illustrated in FIGS. 1 through 3.

Figure 5:
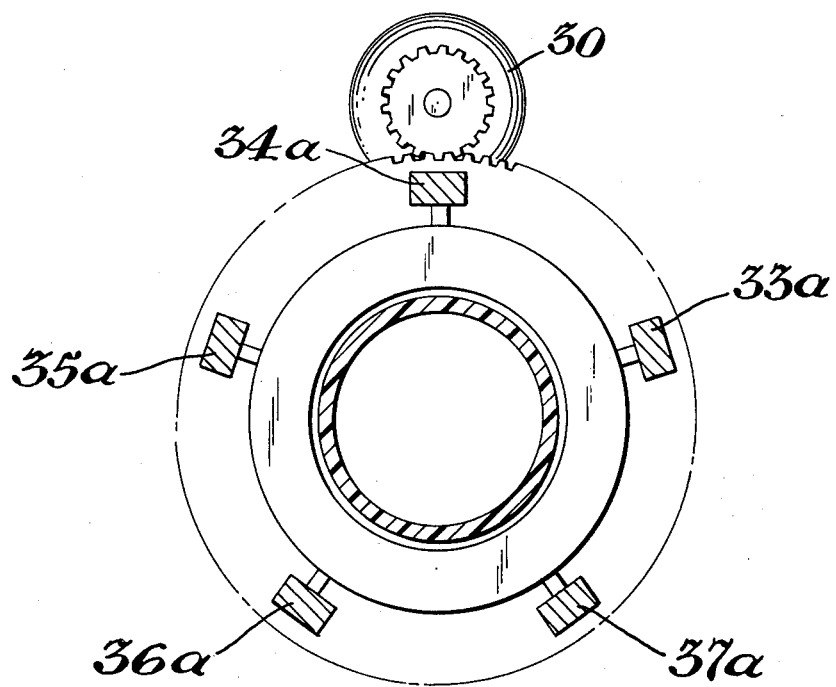
FIG. 5 is a sectional view of the assembly of FIG. 4 taken along the line 5—5 thereof.

In FIG. 5 there is a schematic representation of a view of a device such as that as depicted in FIG. 4 showing the location of die plate operating rods 33a through 37a. The cam 26 has a single step cam groove 27 disposed therein, that is, for each rotation of the cam 26 an operating rod such as the operating rod 34a is slowly pushed toward the smaller end of 31 and rapidly drawn toward the major end of conduit 31. Thus, four of the five operating rods as depicted in FIG. 5 move slowly away from the cam 26 and one is moved relatively rapidly toward the cam 26 bringing with it its associated die plate. Thus, the five die plates 33 through 37 as depicted in FIG. 4 most of the time during the rotation of the cam 26 moves slowly away from the cam while the die plate which encounters the step 27a in the camming groove 27 is drawn toward the cam providing incremental reduction in the diameter of the tube.

Figure 6:
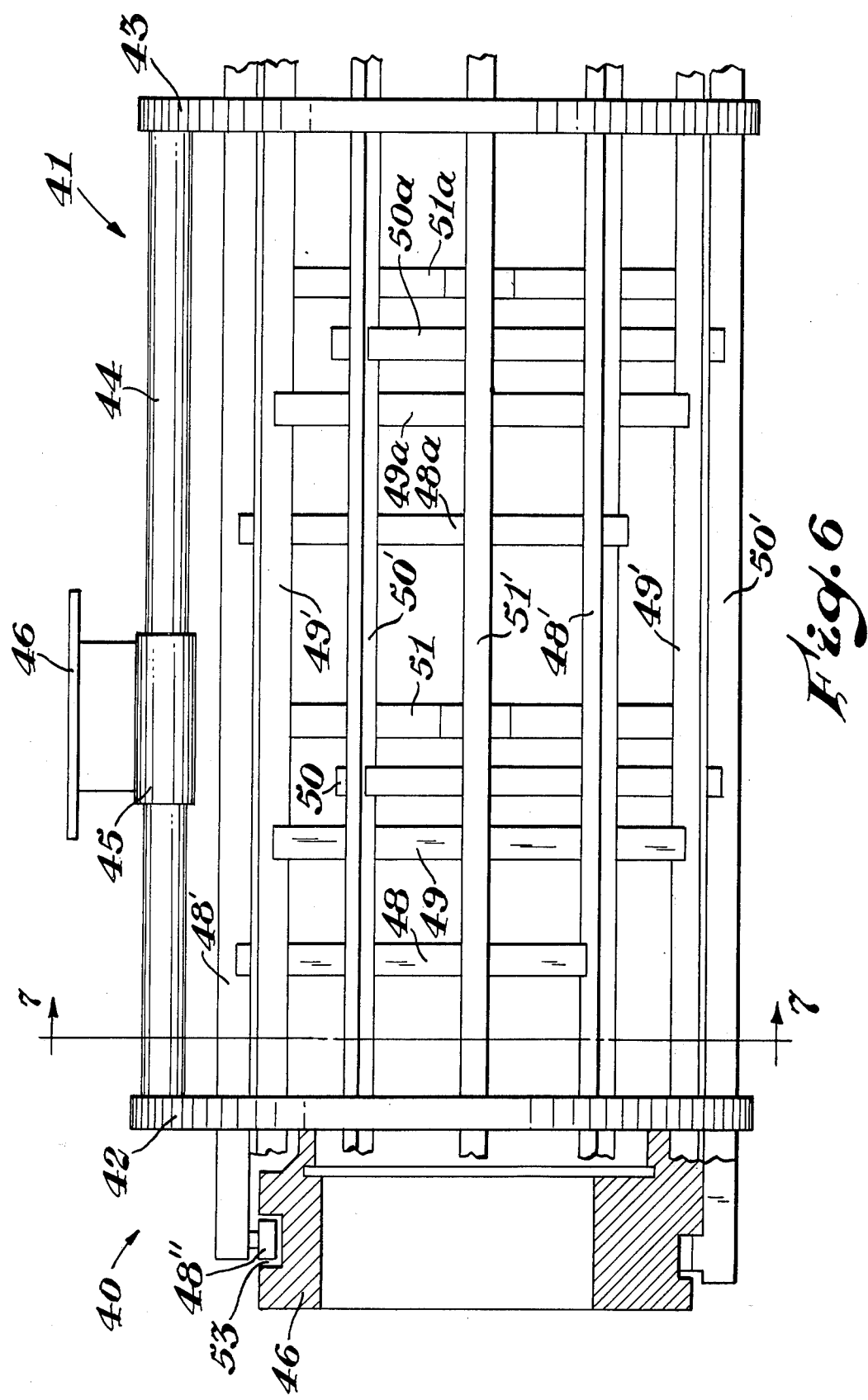
FIG. 6 is a schematically plan view of a simplified apparatus in accordance with the invention.

In FIG. 6 there is a simplified schematic representation of a practical apparatus in accordance with the present invention generally designated by the reference numeral 40. The apparatus 40 comprises a frame 41. The frame 41 has a first or inlet end member 42 and a second or discharge end member 43. The end members 41 and 42 are affixed to each other by a longitudinal frame member 44. A bearing 45 slidably engages the longitudinal frame member 44. A mounting bracket 46 is rigidly affixed to the bearing 45. The first end member 42 has rotatably affixed thereto a hollow cam member 46 of the general configuration cam member 26 of FIG. 4. The cam member 46 is rotated by a rotating means (not shown). Within the frame 41 are disposed die plates 48, 49, 50 and 51. The die plates 48 through 51 are arranged in a manner generally as the die plates of FIGS. 1 through 4 have successively smaller openings as they become more remote from the first end 42. A second set of die plates 48a, 49a, 50a and 51a are disposed adjacent the discharge end 43 and the openings in the die plates 48a through 51a are smaller than the openings in the die plates 48 through 51 and decrease in diameter toward the discharge end 43 of the frame 41. The openings of the die plates 48 through 51 and 48a through 51a are generally coaxially arranged. Three die plate actuating rods 48' engage die plates 48 and 48a by means of notches formed in both the die plates and the actuating rods. Each of the actuating rods has disposed thereon a cam follower 48" which engages an outwardly disposed generally annular camming groove 53 formed in the outer surface of the cam 46. Similarly actuating rods 49', 50' and 51' support the die plates 49 through 51 and 49a through 51a. The die plates as shown in FIG. 7 have a generally triangular peripheral configuration wherein the die plates are supported by the actuating rods.

Figure 7:
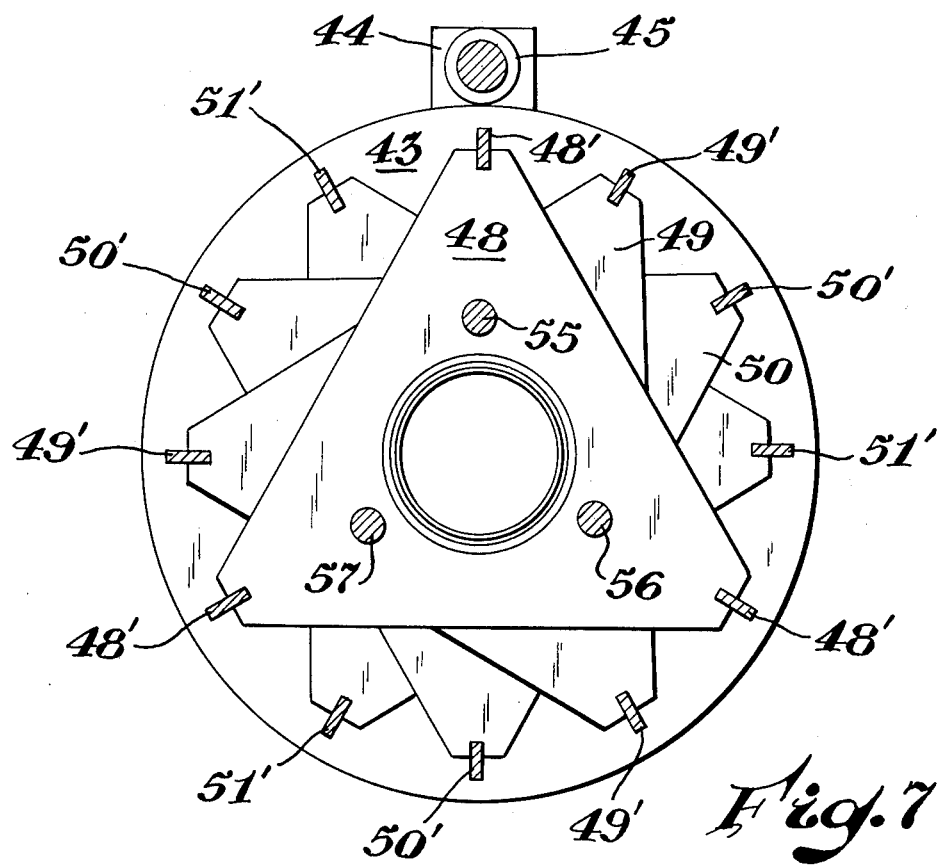
FIG. 7 is a sectional view of the apparatus of FIG. 6.
Figure 8:
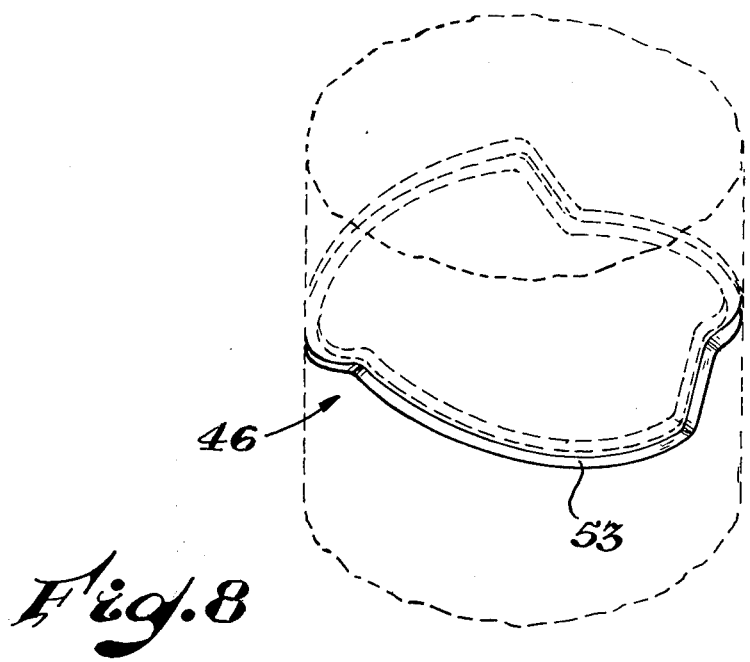
FIG. 8 is a schematic representation of operating cam employed in the apparatus of FIGS. 6 and 7.

In FIG. 8 there is schematically depicted the configuration of the groove 53 of the cam 46. The groove 53 is a three cycle groove, that is, three cycles per 360° rotation of the cam and of such configuration that the actuating rods 48' through 51' are moved slowly away from the frame member 42 and subsequently rapidly returned toward the frame member 42, thus, as illustrated in FIGS. 6 and 7, three of the die plates remain fixed relative to one another while the fourth plate moves.

Apparatus generally as shown in FIGS. 6–8 but having ten plates per die plate group and three die plate groups provides a convenient means of reducing the diameter of deformable plastic tubes without causing increase in length.

A wide variety of thermoplastic resinous compositions are useful in the practice of the present invention including polyperfluorocarbons such as polytetrafluoroethylene, polychlorotrifluoroethylene; polyhalohydrocarbons such as polyvinylfluoride; vinylidene chloride polymers such as sarans, vinylidene chloride-ethyl acrylate copolymers; polyvinyl chloride; polyolefins such as polypropylene, polyethylene, resinous polymers of ethylene and propylene; nylon 6, nylon 66, nylon 7 and the like; alkenyl aromatic polymers including styrene polymers such as rubber-modified polystyrene, styrene-acrylonitrile; polyethers such as polymers of 2,2-bis(chloromethyl)oxacyclobutane. Oftentimes if the tube has been reduced in diameter at room temperature, the tube may be placed within the rigid outer casing, warmed slightly to cause accelerated expansion and provide a lined conduit in which the lining tightly engages the rigid outer housing.

For many purposes, the expansion of the conduit due to plastic memory is adequate to retain the liner within the outer casing, such as a steel pipe, under service requirements. If it is anticipated that there will be a significant tendency of the liner to be subject to repeating longitudinal stresses wherein movement is undesirable, generally a liner with larger initial diameter will be employed together with a greater degree of reduction of diameter of the liner.

Beneficially, if desired, a button or tapered plug may be forced through the lined tube to cause the liner to further expand and deform into imperfections within the conduit wall to provide a lined pipe which will show maximum resistance to molding under an axially applied force.

Lined conduit prepared in accordance with the present invention maintains the liner under circumferential and longitudinal compressive forces which substantially reduces the possibility of stress cracking of the liner as well as longitudinal movement.

The precise number of die plates employed in the practice of the invention will vary depending upon the lubricity of the surface of the particular liner used, and the degree of the reduction desired. The temperature of diameter reduction, however, for most synthetic resinous liners not more than 20 percent and preferably 10% of the die plates should move at any one time relative to the remaining die plates which do not move relative to one another. Generally the orifice in the die plates is provided with a generally frustoconical configuration and a sharp trailing edge. By trailing edge is meant each of the die plate orifices adjacent the discharge end of the apparatus and advantageously an outwardly flaring or belled forward edge which facilitates the entrance of a lined conduit into the die plate opening while the sharp trailing edge serves to grip the conduit and prevent motion of the conduit towards the leading edge of the die opening.

The method and apparatus of the present invention are successively employed to reduce diameters of synthetic resinous tubes of the hereinbefore delineated resins in a highly satisfactory manner.

As in apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A tube diameter reducing apparatus, the tube diameter reducing apparatus comprising in cooperative combination
   a frame, the frame having a longitudinal axis,
   a plurality of die plates supported within the frame and selectively portionable therein, the die plates each defining
   a tube receiving opening, the tube receiving opening of the die plates being of generally successively decreasing diameter, the openings of the die plates being disposed in planes generally normal to the longitudinal axis, the openings of the die plates being generally coaxially disposed,
   means to: (a) selectively position the die plates along the axis of the frame, (b) provide sequential movement of a minor portion of the die plates relative to a major portion thereof, and (c) subsequently move each of the die plates relative to a major portion of the die plates whereby a tube on having a diameter approximately the diameter of the larger tube receiving opening the tube on being passed through the openings of decreasing diameter by the movement of die plates is reduced in diameter.

2. The apparatus of claim 1 wherein the means to selectively position to die plates along the axis of the frame, comprises a plurality of die actuating rods which engage a cam.

3. The apparatus of claim 2 wherein the die plates have a generally triangular peripheral configuration and each die plate is positioned by three die plate actuating rods.

* * * * *